Figure 1:
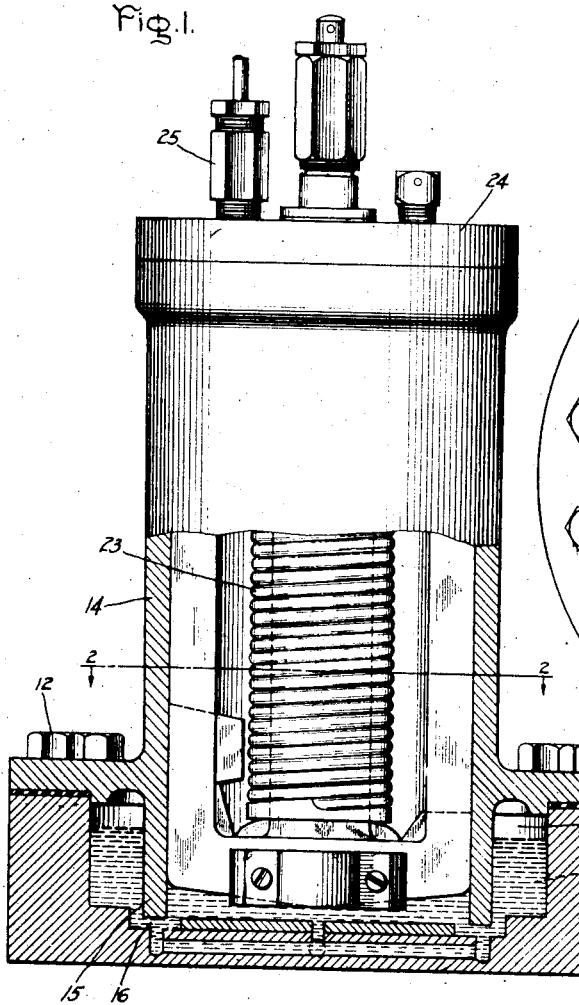

June 11, 1929.  L. W. THOMPSON  1,717,280

PRESSURE MEASURING INSTRUMENT

Filed Dec. 28, 1927

Inventor:
Louis W. Thompson
by
His Attorney.

Patented June 11, 1929.

1,717,280

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

PRESSURE-MEASURING INSTRUMENT.

Application filed December 28, 1927. Serial No. 243,120.

The present invention relates to pressure-measuring instruments and while it is adapted for use in any instance where pressure is to be measured, it is more particularly adapted for use as a pressure-measuring instrument in a flow meter for measuring the flow of fluid through pipes. Accordingly I have specifically illustrated and described my invention as embodied in a flow meter. It is to be understood, however, that this is only by way of example and that the invention is not limited to this application.

The invention relates especially to such instruments of what may be termed the electric transformer type, this being the type disclosed in the patent to Jacob W. McNairy and myself, No. 1,560,951, patented November 10, 1925. An instrument of such type is in the nature of an electrical transformer wherein the primary comprises a winding associated with the trailing leg of the U-tube and the secondary comprises liquid, such as mercury, which is a conductor of electricity and which in rising in the trailing leg of the U-tube provides an annular ring or loop of liquid surrounding the primary winding. The liquid ring or loop forms a closed secondary having a single turn which varies in cross section as the liquid rises and falls in the trailing leg of the U-tube. A measuring circuit including a source of alternating potential is connected to the primary winding and there is created in such circuit a flow of current which varies with the cross sectional area of the liquid ring which in turn is a function of its height. This current is then measured to give a measure of the fluid flow and may be integrated to give the total flow.

If it be assumed that the primary winding circuit has no resistance so the watt loss in it is zero and that there is no flux leakage in the transformer so that the losses in it are zero also, then the total watt consumption will be that consumption in the liquid ring and will vary inversely with the resistance of the liquid ring. The resistance of the liquid ring depends upon its cross sectional area and mean length so that assuming a vertical space of uniform cross section and fixed mean length in which the liquid rises, the resistance of the closed secondary winding formed by the liquid loop will be a direct function of the depth of the liquid ring or loop; i. e., the height of the liquid in the space. It follows, therefore, that under these conditions, the watt consumption will be a direct function of the depth of the liquid ring or loop in the liquid space. However, in actual practice, these conditions do not obtain and also in the case of a flow meter for example, it is desirable for known reasons, to have the watt consumption in the measuring circuit proportional to the square root of the liquid deflection. It becomes desirable, therefore, in practice, to modify the change in watt consumption with variations in the liquid height, so as to obtain the desired relation between the force being measured and the watt consumption. In the above referred to patent to McNairy and myself certain ways for modifying the watt consumption for a given liquid height of mercury ring are disclosed. The object of my present invention is to provide another way whereby this result may be obtained and a way which under certain circumstances is very advantageous in practical used.

For a consideration of what I believe to be novel and my invention, attention is directed to the accompanying description and the claims appended thereto.

Figure 2:
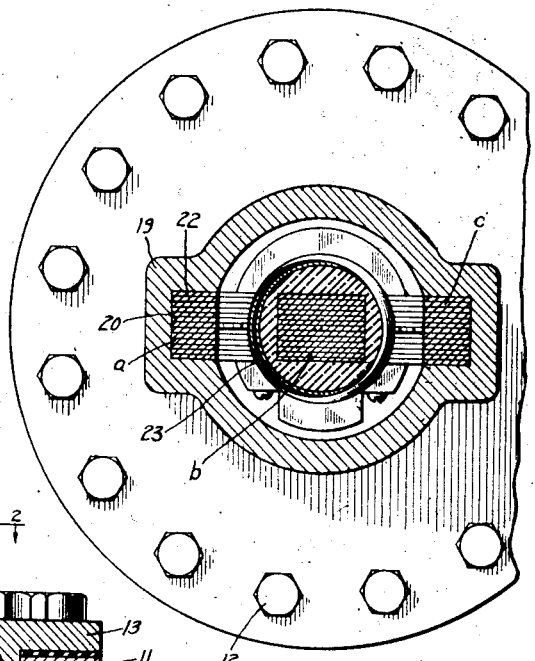
Figure 3:
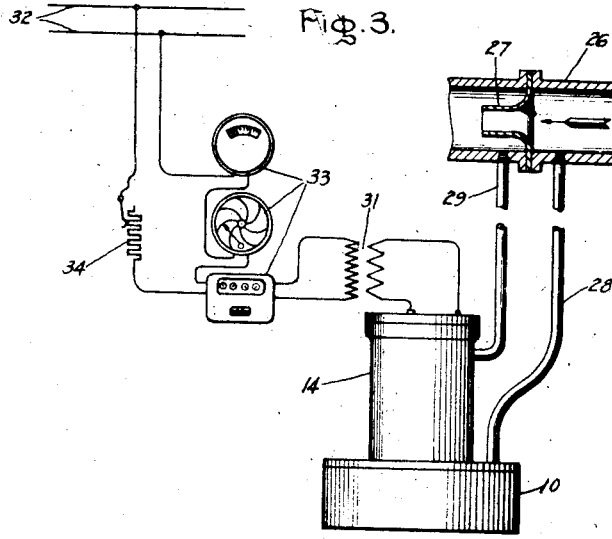
Figure 4:
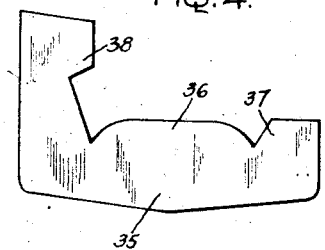

In the drawing, Fig. 1 is a side elevation partly in section of a pressure measuring instrument embodying my invention; Fig. 2 is a sectional view taken on line 2—2, Fig. 1; Fig. 3 is a diagrammatic view illustrating the manner in which the pressure measuring instrument is connected for use as a flow meter, and Fig. 4 is a detail view.

Referring to the drawing, 10 indicates a base which may be circular and may be made of metal or other suitable material. Formed in base 10 is a well or chamber 11 which forms one leg of a U-tube. Fixed on base 10 by a ring of bolts 12 is a cover plate 13 from which projects a tube 14 which forms the other leg of a U-tube. Tube 14 projects below cover plate 13 to a point adjacent the bottom wall of well 11 as is indicated at 15. The two legs of the U-tube, i. e., well 11 and tube 14 are connected to each other by the spaces 16 beneath the lower end of tube 14. Tube 14 is provided with two longitudinally-extending opposed ridges 19 in which are rectangular grooves 20 opening into tube 14. Mounted in grooves 20 is a rectangular transformer core 22 comprising three legs, $a$, $b$ and $c$. The outside legs $a$ and $c$ have a sliding fit in groove 20 so that the core 22 of the transformer can be raised and lowered in tube 14. Surrounding the middle leg $b$ of the transformer core 22 is a primary winding 23 of suitably insulated wire. The upper end of tube 14 is closed by a cover plate 24. One terminal of transformer winding 23 may be grounded on the casing of the instrument while the other terminal extends out through a suitable bushing 25.

In Fig. 3, 26 indicates a conduit through which a fluid to be metered flows and in it is a pressure difference creating device 27 which creates a pressure difference which bears a definite relation to the rate of flow. Any suitable form of pressure difference creating device may be used, a known form term usually a flow nozzle being illustrated in the present instance. The leading pressure side of pressure difference creating device 27 is connected to well 11 by a pipe 28 and the trailing pressure side is connected to tube 14 by a pipe 29. In the U-tube is a quantity of indicating liquid 30 which is a conductor of electricity. Preferably mercury is utilized.

As is well understood at no flow in conduit 26 the indicating liquid will stand at the same level in the two legs of the U-tube while when flow takes place in conduit 26, the pressure difference created by device 27 being applied to the two legs of the U-tube will cause the level of the liquid in well 11 to lower and that in leg 14 to rise, the amount of deflection being a function of the flow in conduit 26.

As shown in Fig. 3, the primary winding 23 is connected through a suitable step-down transformer 31 to a source of alternating current of constant potential 32. In this circuit are suitable measuring instruments 33, a watt hour meter, a curve drawing ammeter and an indicating ammeter being indicated in the present instance. Also in the circuit is an adjustable resistance 34.

The instrument so far described is similar to that disclosed in the above-referred to patent. Its method of operation is known and will be understood from the description already given.

According to the preferred form of my invention, I modify the watt consumption of the liquid ring by providing an insulating separator which projects into the liquid ring and serves to separate to a desired degree the liquid ring thereby reducing the effective cross sectional area of the liquid ring. The separator may be shaped and so located along the path of the liquid loop as to give the result desired. Preferably I utilize one of the laminations of the transformer core as a separator, the edge of the lamination being extended so that it projects out into the liquid ring space and being shaped to modify to the desired degree and at the desired point or points the effective cross sectional area of the liquid ring.

In the drawing, 35 indicates one of the transformer laminations which is shaped so that at the bottom of the core it projects upward as is indicated at 36 and at the sides it projects outward as is indicated at 37 and 38. With this arrangement it will be seeen that as the liquid begins to rise in leg 14 the cross sectional area of the liquid ring will first increase rapidly but that when the projection 38 is reached it will increase less rapidly for a time. By varying the size of the projections and their location, modification of the effective cross sectional area of the liquid ring may be obtained to any desired extent and at any point along the vertical path of the liquid loop. In connection with the transformer lamination, it will be understood that its surface is covered with an insulating substance so that it forms an insulator.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a measuring instrument, the combination with walls defining a loop in which a conducting liquid moves to form a closed transformer winding, of insulating means projecting into said loop to vary the effective cross sectional area of the conducting liquid in the loop.

2. In a measuring instrument, the combination with walls defining a loop in which a conducting liquid moves to form a closed transformer winding, said walls including as a part of their structure a laminated transformer core, of means comprising an extension of one of the laminations of the transformer core which projects into said loop to vary the effective cross sectional area of the conducting liquid in the loop.

3. In a measuring instrument, the combination with walls defining a loop in which a conducting liquid moves to form a closed transformer winding, of insulating means which projects into the loop in the path of movement of the liquid to vary the electrical conductivity of the liquid loop.

4. The combination with a U-tube, one leg of which comprises walls defining a loop, and a liquid in the U-tube, said liquid being a conductor of electricity, of an insulating separator member which projects transversely of said loop whereby its serves to vary the electrical conductivity of the liquid in the loop.

In witness whereof, I have hereunto set my hand this 27th day of December, 1927.

LOUIS W. THOMPSON.